United States Patent

Hauser

[11] 4,214,641
[45] Jul. 29, 1980

[54] DRIVE FOR SELF-PROPELLED LAWN MOWERS

[75] Inventor: Hans Hauser, Fredericktown, Ohio

[73] Assignee: The J. B. Foote Foundry Co., Fredericktown, Ohio

[21] Appl. No.: 915,569

[22] Filed: Jun. 14, 1978

[51] Int. Cl.² .................. B62D 51/04; A01D 35/26
[52] U.S. Cl. .................. 180/19 R; 56/11.8; 192/46
[58] Field of Search .......... 180/19 R; 192/46, 67 R, 192/67 P, 108 R; 64/29; 56/11.8

[56] References Cited
U.S. PATENT DOCUMENTS

| 749,295 | 1/1904 | Jackson | 192/46 |
|---|---|---|---|
| 1,984,966 | 12/1934 | Dohm | 192/46 X |
| 2,645,300 | 7/1953 | Watts et al. | 180/19 R |
| 4,117,652 | 10/1978 | Jones et al. | 180/19 R |

Primary Examiner—John P. Silverstrim
Assistant Examiner—Donn McGiehan
Attorney, Agent, or Firm—Allen D. Gutchess, Jr.

[57] ABSTRACT

A drive for a self-propelled lawn mower is provided. A transmission is mounted on a deck of the lawn mower and has a drive shaft extending toward each of two wheels rotatably mounted on opposite sides of the deck. A driven gear is located adjacent each of the wheels and mounted for rotation therewith. Connecting means for connecting the drive shaft and each of the driven gears includes a pinion gear rotatably mounted on the drive shaft with an end of the gear having two diametrically-opposite shoulders. A drive pin extends transversely through the drive shaft adjacent the shoulders and a spring is located on the shaft urging the pinion gear toward the drive pin. When the drive shaft is driving the mower forwardly through the gears, the drive pin engages the shoulders of the pinion gear to provide a driving connection. When the pinion gear is rotating faster than the drive shaft, the drive pin rides up slanted surfaces adjacent the shoulders to accommodate the difference in rotational speeds.

4 Claims, 7 Drawing Figures

U.S. Patent  Jul. 29, 1980  4,214,641
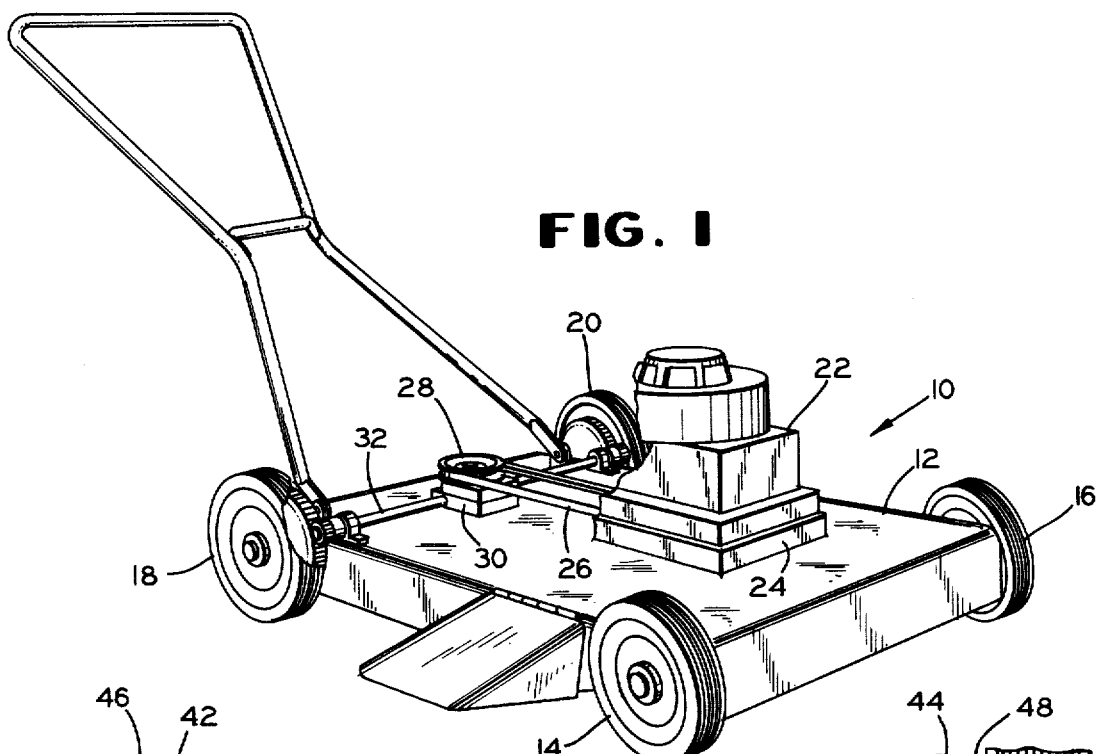
FIG. 1
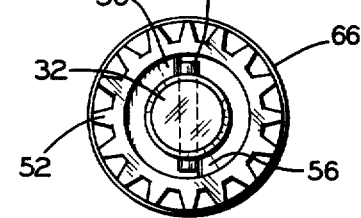
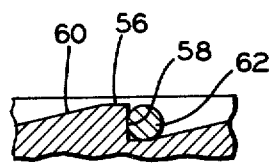
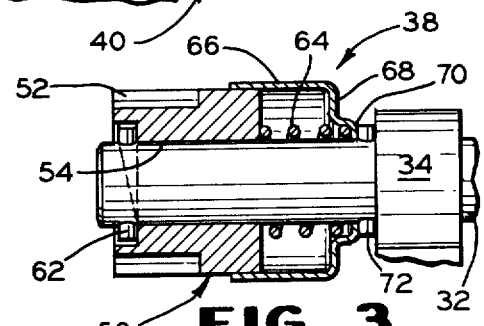
FIG. 2 FIG. 3
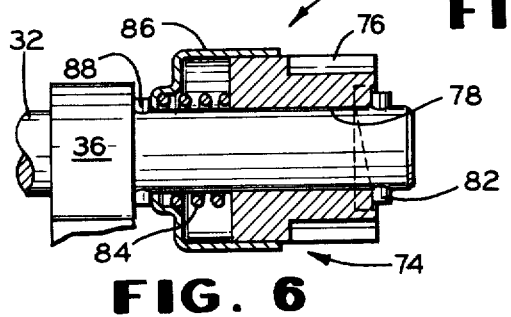
FIG. 4  FIG. 5
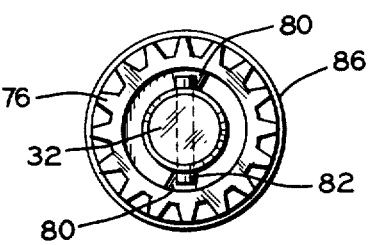
FIG. 6  FIG. 7

DRIVE FOR SELF-PROPELLED LAWN MOWERS

This invention relates to a drive for a self-propelled lawn mower.

A self-propelled, walking lawn mower commonly has a direct drive connection from the engine to the mower blade and to the mower wheels. The speed of the blade and wheels are then controlled simultaneously by the throttle of the engine. Consequently, excessive forward speed or stalling of the engine results under some conditions. A lawn mower of this type also requires a special separate power take-off shaft for the engine, which adds to the overall cost.

A universal transmission designed for self-propelled, walking lawn mowers is shown in Jones et al U.S. Pat. application Ser. No. 728,044, now U.S. Pat. No. 4,117,652. This transmission has a pulley which is driven through a belt connected to a drive pulley on a single drive shaft of the engine, with the mower blade being mounted on and driven by the same drive shaft. The transmission is mounted on the deck of the mower, usually to the rear of the engine, and has a drive shaft extending toward each of two wheels rotatably mounted on opposite sides of the mower deck.

Ratchet coupling devices are also employed, as disclosed in the aforesaid patent application, to connect the drive shaft and the wheels and enable the wheels to be driven in unison or one turn faster than the other, to provide a differential effect.

In accordance with the present invention, an improved connecting device is provided for connecting the drive shaft of a transmission on a deck of a self-propelled lawn mower to each of two wheels. The new connecting device is more simple in design and less costly than the device discussed above. It comprises a pinion gear rotatably mounted on the drive shaft and having teeth engageable with a larger driven gear located near each wheel and mounted for rotation therewith. An end of the pinion gear has diametrically-opposite shoulders with right angle surfaces on the sides opposite the direction in which the pinion gear rotates when driving the mower forwardly. Each shoulder also has a slanted surface on the opposite side, toward the direction in which the gear rotates when driving the mower forwardly. A drive pin is affixed to the drive shaft and extends outwardly on opposite sides thereof. The pin engages the shoulders of the pinion gear when driving the mower forwardly and the pin rides up the slanted surfaces of the shoulder when the gear is rotating faster than the drive shaft, as when the mower if being turned or otherwise manipulated along a nonlinear path so that one wheel rotates faster than the other. A coil spring is located on the drive shaft adjacent the pinion gear and is backed up by another pin located on the drive shaft. Preferably, a generally cylindrical cover encompasses the spring and fits over an end of the pinion gear opposite the end having the shoulders.

The pinion gear of the connecting device can be made of powdered metal and the other components of low cost stampings or of standard commercial parts. Thus, the connecting device is of low cost and at the same time is simple in design and yet reliable and relatively maintenance free.

It is, therefore, a principal object of the invention to provide an improved drive for a self-propelled lawn mower having the advantages discussed above.

Other objects and advantages of the invention will be apparent from the following detailed description of a preferred embodiment thereof, reference being made to the accompanying drawings, in which:

FIG. 1 is a somewhat schematic view in perspective of a self-propelled lawn mower embodying the invention;

FIG. 2 is a fragmentary plan view of part of a drive of the lawn mower of FIG. 1;

FIG. 3 is a fragmentary view of longitudinal cross section of a connecting device of the lawn mower drive;

FIG. 4 is an end view of the connecting device of FIG. 3;

FIG. 5 is an enlarged view in transverse cross section of a shoulder portion of a component of the connecting device;

FIG. 6 is a fragmentary view in longitudinal cross section of another connecting device of the lawn mower drive, shown in a different position; and FIG. 7 is an end view of the connecting device of FIG. 6.

Referring to FIG. 1, a self-propelled, walking lawn mower 10 includes a metal deck 12 with a pair of front wheels 14, 16 and a pair of rear, driven wheels 18, 20. These are rotatably mounted on opposite sides of the deck by axles 21. An internal combustion engine 22 is mounted on a raised portion 24 of the deck 12 with the rear of the raised portion being open. The engine 22 has a single, downwardly-depending drive shaft on the end of which is mounted the mower blade. In between the engine and the blade, a drive pulley or sheave is affixed, with a V-belt 26 connecting the drive pulley with a driven pulley 28 of a transmission 30. As discussed in the aforesaid patent application, the transmission can have two speeds and is controlled by a remote control (not shown) mounted on the mower handle. The transmission can also be equipped with a deadman's clutch arrangement.

A drive shaft 32 extends from the transmission 30 toward both of the driven wheels 18 and 20, with end portions of the drive shaft being suitably supported in bearing blocks 34 and 36.

Referring to FIG. 2, the transmission 30 drives the wheels 18 and 20 through the drive shaft 32 and connecting devices 38 and 40 located at the ends of the drive shaft 32. Specifically, the connecting devices enable the drive shaft to drive large driven gears 42 and 44 which are located near the wheels 18 and 20 and are connected to them by hubs 46 and 48, with the gears and the wheels rotating together.

Referring to FIGS. 2-5, the connecting device 38 includes a pinion gear 50 which can be made of powdered metal and is the only somewhat complicated component of the connecting devices. The pinion gear 50 has teeth 52 at the outer end which mesh with teeth of the driven gear 42. The pinion gear also has a bore 54 through which the drive shaft 32 extends, with the pinion gear being rotatably mounted thereon. The outer end, in this instance, of the gear 50 has diametrically-opposite recessed shoulders 56. Each of the shoulders 56 has a substantially right angle surface 58 located on the side opposite the direction in which the gear 50 rotates when driving the mower in a forward direction. Each of the shoulders 56 also has a slanted surface 60 located on the side toward the direction in which the gear 50 rotates when driving the mower forwardly. This direction is counterclockwise for the connecting device 38, as shown in FIG. 4.

A drive pin 62 is located in an end portion of the drive shaft 32 and extends beyond the surface of the drive shaft in diametrically-opposite positions. When the drive shaft 32 is driving the wheel 18 through the pinion gear 50 and the gear 42, the pin 62 engages the surfaces 58 of the shoulders 56 to provide a driving connection. Should the mower 10 be turned toward the left so that the wheel 18 rotates faster than the wheel 20, the pinion gear 50 will rotate faster than the drive shaft 32. The pin 62 then rides up the slanted surfaces 60 and continues to do so until the rotational speed of the pinion gear 50 again equals that of the drive shaft 32.

Resilient means, in the form of a coil spring 64 around the drive shaft 32, urges the pinion gear 50 toward the drive pin 62. A generally cylindrical cover 66 is located around the spring 64 and has an open end which is sized to slip over the inner end of the pinion gear 50. The cover 66 has a closed end 68 with a boss 70 receiving one end of the spring 64, the other end of the spring bearing against the inner end of the pinion gear 50. A back-up pin 72 is affixed in the drive shaft 32 and forms a support for the spring 64.

The cover 66 is a simple stamping while the spring 64 and the pins 62 and 72 are standard commercially-available parts. Hence, the overall connecting device 38 is substantially less expensive than those heretofore known. Further, the device, including relatively few components, is reliable and substantially maintenance free.

The connecting device 40 is similar to the device 38 but is contoured in the opposite direction so as to obtain the same result. Referring to FIGS. 6 and 7, the device 40 has a pinion gear 74 with gear teeth 76, a bore 78, and diametrically-opposite shoulders 80. Again, the shoulders 80 have right angle surfaces on the sides opposite the direction in which the pinion gear 74 rotates when driving the mower forwardly and slanted surfaces on the sides toward the direction in which the pinion gear rotates when driving the mower forwardly. This direction is clockwise, as shown an FIG. 7. A drive pin 82 is affixed to an end portion of the drive shaft 32 and extends outwardly in diametrically-opposite directions. The pin 82 engages the right angle surfaces of the shoulders 80 when driving the wheel 20 and the pin 82 rides up the slanted surfaces of the shoulders when the pinion gear 74 is rotating faster than the drive shaft 32.

The pinion gear 74 is urged toward the pin 82 by a coil spring 84 located around the drive shaft with a cover 86 positioned around the spring and bearing against a back-up pin 88.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. In combination, a drive shaft, a driven gear mounted on a shaft parallel to said drive shaft, a pinion gear rotatably mounted on said drive shaft and having teeth engageable with said driven gear, said pinion gear having a bore through which said drive shaft extends, an outer end of said pinion gear having diametrically-opposite shoulders on common sides thereof and having slanted surfaces on the opposite sides, a drive pin affixed to said drive shaft and extending outwardly on opposite sides thereof, said pin engaging said shoulders when said pinion gear is driving said driven gear, and said pin riding up the slanted surfaces when said pinion gear is rotating faster than said drive shaft, a coil spring located on said drive shaft and bearing against the end of said pinion gear opposite the end having the shoulders, means extending outwardly from said drive shaft backing up said coil spring to maintain it under compression, and a spring cover located around said coil spring, said cover having a substantially closed end extending between an end of said coil spring and said backup means, said cover having an open end extending over an end portion of said pinion gear and being slidably received thereon, whereby said pinion gear can move longitudinally of said drive shaft while said cover is stationary, said cover being sufficiently long to always enclose said coil spring for any position of said pinion gear.

2. The combination according to claim 1 characterized by said back up means being pins affixed to and extending transversely of said drive shaft means.

3. In a self-propelled lawn mower comprising a deck, first and second wheels rotatably mounted on opposite sides of said deck, a transmission mounted on said deck, drive shaft means extending from said transmission toward each of said wheels, and first and second driven gears adjacent said wheels and mounted for rotation therewith, the improvement comprising connecting means for connecting said drive shaft means and said first and second gears, said connecting means comprising a first pinion gear rotatably mounted on said drive shaft means and having teeth engagable with said first driven gear, said first pinion gear having a bore through which said drive shaft means extends, an end of said pinion gear having diametrically-opposite shoulders with substantially right angle surfaces on the sides opposite the direction in which said pinion gear rotates when driving said mower forwardly and having slanted surfaces on the sides toward the direction in which said pinion gear rotates when driving said mower forwardly, a first drive pin affixed to said drive shaft means and extending outwardly on opposite sides thereof, said pin engaging said shoulders when said pinion gear is driving the mower forwardly, and said pin riding up the slanted surfaces when said pinion gear is rotating faster than said drive shaft means, and a coil spring urging said pinion gear toward said drive pin, said drive shaft means having means backing up said coil spring, said connecting means also comprising a second pinion gear rotatably mounted on said drive shaft means and having teeth engagable with said second driven gear, said second pinion gear having a bore through which said drive shaft means extends, an end of said second pinion gear having diametrically-opposite shoulders with substantially right angle surfaces on the sides opposite the direction in which said second pinion gear rotates when driving said mower forwardly and having slanted surfaces on the sides toward the direction in which said second pinion gear rotates when driving said mower forwardly, a second drive pin affixed to said drive shaft means and extending outwardly on opposite sides thereof, said second pin engaging said shoulders of said second pinion gear when said second pinion gear is driving the mower forwardly, and said second pin riding up the slanted surfaces of said second pinion gear when said second pinion gear is rotating faster than said drive shaft means, and a second coil spring urging said second pinion gear toward said second drive pin, said drive shaft means having second means backing up said second coil spring, and spring covers located around said coil springs, said covers having open ends slidably received over end portions of said first and second pinion gears.

4. Connecting means according to claim 3 characterized by said back up means being pins affixed to and extending transversely of said drive shaft means.

* * * * *